United States Patent
Faaborg et al.

(10) Patent No.: US 11,935,199 B2
(45) Date of Patent: Mar. 19, 2024

(54) AUGMENTED REALITY DEPTH DETECTION THROUGH OBJECT RECOGNITION

(71) Applicant: GOOGLE LLC, Mountain View, CA (US)

(72) Inventors: Alexander James Faaborg, Mountain View, CA (US); Shengzhi Wu, Shenzhen (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/443,392

(22) Filed: Jul. 26, 2021

(65) Prior Publication Data

US 2023/0026575 A1    Jan. 26, 2023

(51) Int. Cl.
| | |
|---|---|
| *G06T 19/00* | (2011.01) |
| *G06F 16/953* | (2019.01) |
| *G06F 18/21* | (2023.01) |
| *G06T 7/11* | (2017.01) |
| *G06T 7/50* | (2017.01) |
| *G06T 7/70* | (2017.01) |
| *G06V 20/10* | (2022.01) |

(Continued)

(52) U.S. Cl.
CPC .......... *G06T 19/006* (2013.01); *G06F 16/953* (2019.01); *G06F 18/21* (2023.01); *G06T 7/11* (2017.01); *G06T 7/50* (2017.01); *G06T 7/70* (2017.01); *G06V 20/10* (2022.01); *G06N 3/042* (2023.01); *G06N 3/08* (2013.01); *G06T 2207/20021* (2013.01); *G06T 2207/20084* (2013.01)

(58) Field of Classification Search
CPC . G06T 19/006; G06T 7/11; G06T 7/50; G06T 7/70; G06T 2207/20021; G06T 2207/20084; G06F 16/953; G06K 9/6217; G06V 20/10; G06N 3/0427; G06N 3/08
See application file for complete search history.

(56) References Cited

U.S. PATENT DOCUMENTS

| | | |
|---|---|---|
| 9,303,982 B1 | 4/2016 | Ivanchenko et al. |
| 10,262,437 B1 | 4/2019 | Ter Beest |

(Continued)

OTHER PUBLICATIONS

Devassy, J. et. al., "Deep Learning: Architecture and Algorithms" (https://www.jimsindia.org/techbyte2k19/insight/Deep%20Learning%20Architecture%20And%20Algorithms.html), 2019, pp. 1-6.*

(Continued)

*Primary Examiner* — Sarah Lhymn
(74) *Attorney, Agent, or Firm* — Brake Hughes Bellermann LLP (57) ABSTRACT

A computer-implemented method includes receiving a two-dimensional image of a scene captured by a camera, recognizing one or more objects in the scene depicted in the two-dimensional image, and determining whether the one or more recognized objects have known real-world dimensions. The computer-implemented method further includes determining a depth of at least one recognized object having known real-world dimensions from the camera, and overlaying three-dimensional (3-D) augmented reality content over a display the 2-D image of the scene considering the depth of the at least one recognized object from the camera.

17 Claims, 4 Drawing Sheets

(51) Int. Cl.
G06N 3/042 (2023.01)
G06N 3/08 (2023.01)

(56) References Cited

U.S. PATENT DOCUMENTS

| | | | |
|---|---|---|---|
| 11,037,320 B1* | 6/2021 | Ebrahimi Afrouzi | G06T 7/90 |
| 11,388,388 B2* | 7/2022 | Hornstein | H04N 13/383 |
| 2012/0045093 A1* | 2/2012 | Salminen | G06F 16/583 |
| | | | 382/103 |
| 2012/0254369 A1* | 10/2012 | Gillard | H04N 21/4756 |
| | | | 709/219 |
| 2012/0290577 A1* | 11/2012 | Cai | G06V 10/464 |
| | | | 707/E17.046 |
| 2013/0222543 A1* | 8/2013 | Bae | G01S 17/08 |
| | | | 348/46 |
| 2013/0250078 A1* | 9/2013 | Levy | A61H 3/061 |
| | | | 348/62 |
| 2016/0189381 A1* | 6/2016 | Rhoads | G06T 7/33 |
| | | | 382/103 |
| 2017/0278289 A1* | 9/2017 | Marino | G06T 7/536 |
| 2017/0304732 A1* | 10/2017 | Velic | A63F 13/213 |
| 2018/0025540 A1* | 1/2018 | Ma | G06T 15/04 |
| | | | 345/419 |
| 2018/0144458 A1* | 5/2018 | Xu | H04N 13/204 |
| 2018/0276841 A1* | 9/2018 | Krishnaswamy | G06V 10/25 |
| 2018/0322706 A1* | 11/2018 | Drouin | G06F 3/011 |
| 2019/0026956 A1* | 1/2019 | Gausebeck | G06T 19/20 |
| 2019/0026958 A1* | 1/2019 | Gausebeck | H04N 13/10 |
| 2019/0043203 A1* | 2/2019 | Fleishman | H04N 5/247 |
| 2019/0066314 A1* | 2/2019 | Abhari | G06T 7/33 |
| 2019/0122378 A1* | 4/2019 | Aswin | G06T 5/003 |
| 2019/0147245 A1* | 5/2019 | Qi | G06V 10/82 |
| | | | 382/103 |
| 2019/0311546 A1* | 10/2019 | Tay | G06T 5/50 |
| 2019/0384978 A1 | 12/2019 | Lee et al. | |
| 2020/0074661 A1* | 3/2020 | Anisimovskiy | G06T 3/0006 |
| 2020/0302686 A1* | 9/2020 | Totty | G06T 7/12 |
| 2020/0380762 A1* | 12/2020 | Karafin | G06T 17/20 |
| 2021/0092286 A1 | 3/2021 | Kolesov et al. | |
| 2021/0158561 A1* | 5/2021 | Park | G06T 15/20 |
| 2021/0182639 A1* | 6/2021 | Brent | G06F 3/147 |
| 2021/0183088 A1* | 6/2021 | Gallo | G06T 7/55 |
| 2021/0256657 A1* | 8/2021 | Meng | G06N 3/0454 |
| 2021/0393479 A1* | 12/2021 | Freeman | G06V 20/653 |
| 2022/0198762 A1* | 6/2022 | Komoriya | G06V 10/70 |
| 2022/0300728 A1* | 9/2022 | Assouline | G06V 20/20 |
| 2022/0301272 A1* | 9/2022 | Assouline | G06T 7/50 |

OTHER PUBLICATIONS

Melnick, Kyle, "Google Rolls out New AR Features for Its Lens App", May 28, 2019, pp. 1-3 (https://vrscout.com/news/new-ar-features-google-lens/#).*

Jakl, Andreas, "Easily Create a Depth Map with Smartphone AR (Part 1)", Dec. 1, 2020 (https://www.andreasjakl.com/easily-create-depth-maps-with-smartphone-ar-part-1/) (pp. 1-8).*

Martínez-Díaz S. 3D distance measurement from a camera to a mobile vehicle, using monocular vision. Journal of Sensors. Apr. 16, 2021;2021.*

Alphonse PJ, Sriharsha KV. Depth perception in single rgb camera system using lens aperture and object size: a geometrical approach for depth estimation. SN Applied Sciences. May 1, 2021;3(6):595.*

International Search Report and Written Opinion for PCT Application No. PCT/US2022/074004, dated Nov. 10, 2022, 10 pages.

* cited by examiner

AUGMENTED REALITY DEPTH DETECTION THROUGH OBJECT RECOGNITION

TECHNICAL FIELD

This disclosure generally relates to image processing. In particular, the disclosure relates to the processing of images for augmented reality applications.

BACKGROUND

Augmented reality (AR) employs computer vision, image processing and computer graphics techniques to merge digital content into the real-world. Augmented reality (AR) applications add virtual components or objects (e.g., three-dimensional (3-D) AR objects) to images of a real-world scene. An AR application may, for example, add the virtual components to camera images on a smartphone display to enhance a user's view of the real-world scene. Depth estimation is a computer vision design task to estimate depth from image data (e.g., a two-dimensional (2-D) RGB image). In some conventional approaches, multiple cameras, and/or physical markers in the scene, are used to reconstruct a depth map from multiple views of the same scene/object for generating a 3-D model of the scene. However, estimating a depth map from a single image may require extensive computation power, which, in many cases, is not a suitable task for mobile applications, for example, on smartphones.

SUMMARY

In general aspect, a computer-implemented method includes receiving a two-dimensional (2-D) image of a scene captured by a camera, and recognizing one or more objects in the scene depicted in the 2-D image. The method also includes determining whether the one or more recognized objects have known real-world dimensions, and determining a depth from the camera of at least one recognized object having known real-world dimensions. The method further includes overlaying augmented reality content over a display of the 2-D image of the scene using the depth from the camera of the at least one recognized object having known real-world dimensions to position the augmented reality content.

In a general aspect, a computing device includes at least one processor, and a memory storing instructions. The instructions when executed by the at least one processor cause the at least one processor to receive a two-dimensional (2-D) image of a scene captured by a camera and recognize one or more objects in the scene depicted in the 2-D image, determine whether the one or more recognized objects have known real-world dimensions, and determine a depth of at least one recognized object having known real-world dimensions from the camera. The instructions when executed by the at least one processor further cause the at least one processor to overlay augmented reality content over a display of the 2-D image of the scene using the depth of the at least one recognized object from the camera to position the augmented reality content.

In a general aspect, a device includes a camera, a processor, and a memory. The processor is configured to execute instructions stored in the memory causing the processor to receive a two-dimensional (2-D) image of a three-dimensional (3-D) scene recorded by the camera, identify an object depicted in the 2-D image as having known real-world dimensions, determine a depth of the identified object from the camera based at least in part on the known real-world dimensions of the identified object, and based on the determined depth of the identified object, position augmented reality content on a display of the 2-D image.

DETAILED DESCRIPTION

Augmented reality (AR) applications (e.g., mobile AR apps, gaming applications, etc.) may seek to display virtual AR objects (e.g., videos, audio, photos, text, animation, or 3-D AR objects) on top of a camera view (i.e., a 2-D image) of a real-world scene. The 2-D image of a real-world scene may be displayed, for example, on a smartphone display, or other computer monitor or screen (e.g., a gaming monitor, a television screen, etc.). The camera view of a real-world scene can be enhanced (augmented) by overlaying computer-generated AR objects or digital information on the displayed 2-D image. In some scenarios, the computer-generated AR objects may be overlaid on live views of the real-world scene seen by the user using see-through devices (e.g. vehicle windshields, glasses, etc.). The computer-generated AR objects for enhancing the views seen through the see-through devices may be displayed, for example, on displays overlapping the live views (e.g., on a vehicle heads-up-display (HUD), or on an in-lens or projection displays in smartglasses, etc.).

A 3-D model of the real-world scene (which, e.g., describes the relative distances, orientations, and motion between objects, items, or features of the real-world scene) may be helpful in properly integrating (e.g., sizing and positioning) the virtual AR content (objects) with the camera view for a good AR experience (e.g., a realistic AR experience).

In traditional hardware-based approaches for developing the 3-D model of the real-world scene, multiple cameras may be deployed to collected multiple images of the scene from different perspectives and multiple sensors may be deployed (e.g., depth sensors, accelerometers, GPS sensors, etc.) to determine camera positions and motions relative to the scene. The multiple images may be used to triangulate distances between objects or features in the real-world scene. At least one drawback of these hardware-based approaches for developing the 3-D model on a small device (e.g., a hand-held smartphone), relates to the battery drain by energy consuming hardware: display on, camera on, orientation sensors, image recognition, and GPS, in the small device (e.g., a hand-held smartphone). Displaying with augmented reality for even a few minutes, for example, on a smartphone can significantly drain the battery of the smartphone.

In one traditional approach for AR displays on a device (e.g., a hand-held smartphone), a user moves or rotates (e.g., swings) the device camera (e.g., smartphone camera) in a circular arc to record image captures of the scene from different camera positions and different parallax perspectives. Surface planes (on which the augmented reality objects can be placed) in the scene may be determined, and a depth map of the entire scene may be calculated, for example, from the camera motion. This approach burdens the device user's AR experience by requiring active participation (e.g., swinging the smartphone) by the user, and the delays caused by the approach can test the patience of the user. Even when users are provided instructions to swing the device (e.g., smartphone) around to record image captures of the scene from different camera positions in an effort to generate AR scene views, many users may fail to understand the instructions and may simply hold the device still, and wait for the AR scene views to automatically appear. However, when a user holds the device still, the AR scene views may never be generated or displayed, and the discouraged user may eventually abandon the effort in frustration.

Augmented reality (AR) systems and methods for inferring 3-D distances between objects or features in a real-world scene from information already present in a 2-D image of the scene are described herein, in accordance with the principles of the present disclosure. The 2-D image may, for example, be a still photograph or an image frame of a video stream of image frames.

The disclosed methods may be implemented for AR applications (e.g., mobile AR applications) using, for example, existing single camera configurations of devices (e.g., smartphones, head worn devices, or smartglasses) to capture the 2-D image of the scene. The methods may involve inferring the distances between objects or features of the real-world scene from information in the 2-D image of the scene. The inferred distances may be considered for properly overlaying a display the 2-D image of the scene with AR objects. The 2-D image of the scene may be co-displayed with the AR content. The inference may be passive, in other words, it does not require motion or movement of the camera (e.g., smartphone, head worn device, or smartglasses camera) to collect images from different perspectives (e.g., different parallax perspectives) or require the active participation of the user (e.g., rotating or swinging the smartphone by the user) to collect images from the different perspectives.

The disclosed methods involve recognizing commonplace items whose real-world dimensions are known a priori in the 2-D image. These known real-world-dimensions items may be items (e.g., soda cans, standard beverage or food containers, vases, etc.) commonly found in indoor settings, or well-known monuments and structures (e.g., Leaning Tower of Pisa, Lincoln Memorial, Golden Gate Bridge, etc.) that may be found in images of outdoor settings. A standard brand XYZ soda can have, for example, a known real-world height of about 122 mm and a diameter of about 66 mm. The Leaning Tower of Pisa has, for example, a known real-world height of 56.67 m.

The disclosed systems may be based on augmented reality platforms that can support mobile apps running on a smartphone. In example implementations, an augmented reality platform may be coupled to an image recognition engine (e.g., Google Lens). The image recognition engine may be configured to inspect the 2-D image for any visually recognizable objects. These recognizable objects (e.g., soda cans, table ware, coffee mugs, household items, office stationery items and equipment, furniture, etc.) may include objects that are listed in a table or a knowledge database as having a priori known real-world dimensions.

Other recognizable objects may include objects whose real-world dimensions may not be known a priori, but can be readily determined, for example, by a web search of information on the Internet. For example, the 2-D image may include a depiction of a skyscraper in a city skyline. The real-world dimensions of the skyscraper may not be known a priori, but may be found by a web search. As another example, the 2-D image may include an image of a Ferris wheel in an amusement park. The real-world dimensions of the Ferris wheel may not be known a priori, but may be found by a web search.

The real-world dimensions of the recognized objects in the 2-D image determined from the knowledge database (or by web search) allow the AR application to determine the camera viewpoint and the depths of the recognized objects present in the scene.

Figure 1:
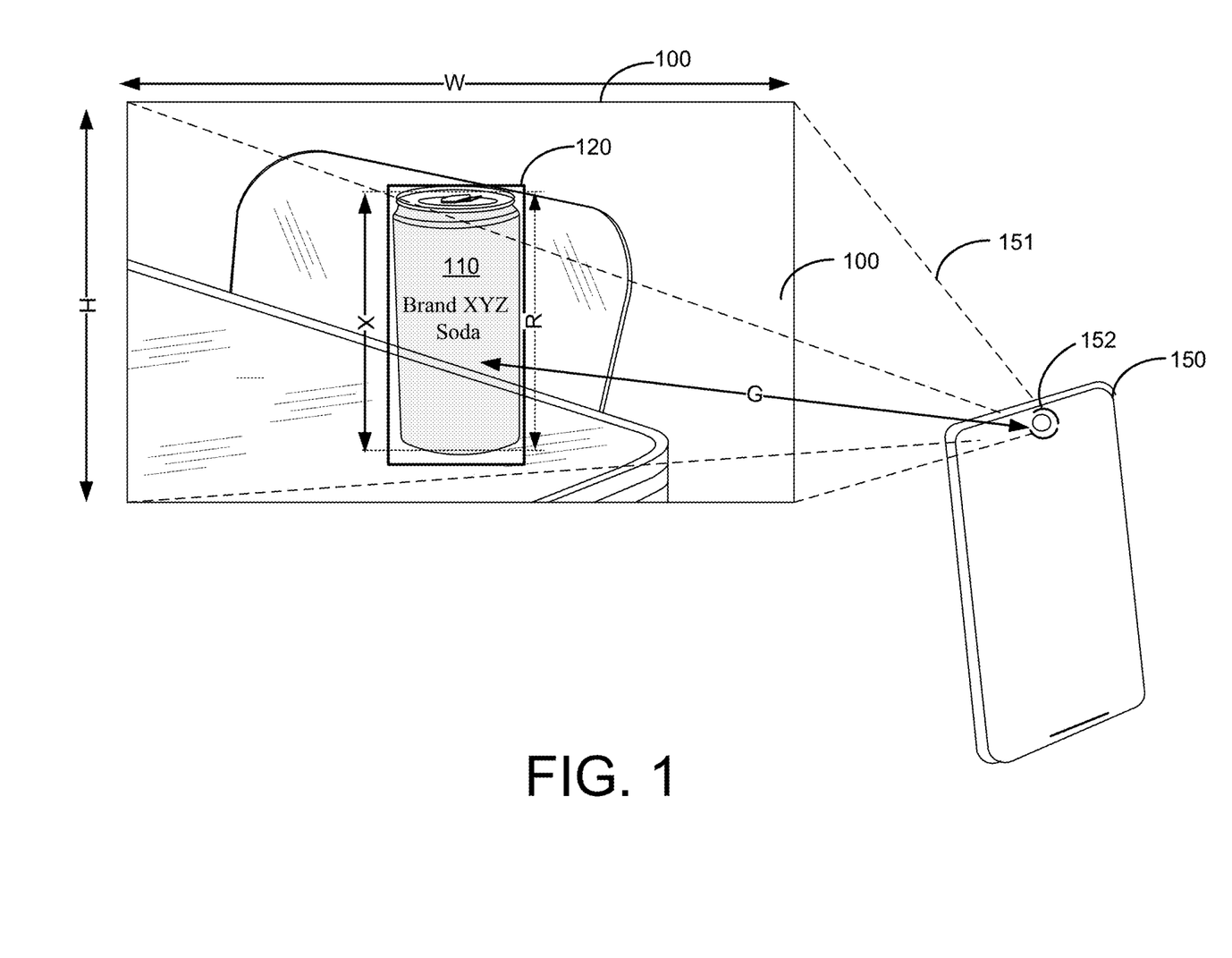
FIG. 1 is a schematic diagram illustrating an two-dimensional (2-D) image captured by a smartphone, in accordance with the principles of the present disclosure.

FIG. 1 is a schematic diagram illustrating an two-dimensional (2-D) image 100 captured by a camera 150, in accordance with the principles of the present disclosure.

Camera 150 may, for example, be a camera in a smartphone or other mobile device. Camera 150 may be characterized by several geometric parameters describing the relationship between camera coordinates and image coordinates. For example, a focal length parameter f may relate to a distance between a camera lens (represented by a pin-hole) and an imaging sensor (represented by an image plane). Offset parameters (x0 and y0) may, for example, describe the x-y co-ordinates of an origin (i.e., a corner) of a rectangular image plane relative to a principal axis of the camera lens. A skew parameter may describe shear distortion (e.g., of rectangular pixels) in the image plane that may be caused, for example, by skew between the principal axis and a normal to the image plane. These parameters may be collectively known as the intrinsic parameters (or the intrinsic parameters matrix), as they may be unique and inherent to a given camera and relate to essential properties of the camera, such as its manufacturing.

2-D image 100 may have a width W and a height H (measured in pixels, or in real-world units, e.g., millimeters). 2-D image 100 may represent portions of a real-world scene visible from a camera point of view (POV) (e.g., PoV 152) within a field of view (FoV) (e.g., FoV 151) of camera 150. The real-world scene may include one or more real-world objects or items that are at different depths or distances from camera 150 (e.g., from camera point of view PoV 152) and are captured or depicted in 2-D image 100.

For example, 2-D image 100 may include a depiction of a recognizable object (e.g., a brand XYZ soda can 110) having known real-world dimensions (i.e., having an object real-world height R=122 mm). Soda can 110 as depicted in 2-D image 100 may have an object image height X (measured in pixels, or in real-world units, e.g., millimeters). Soda can 110 may be at a distance G from camera 150.

2-D image 100 may be segmented or divided into different segments or layers so that equally distant objects belong to one segment or layer and unequally distant objects belong to correspondingly different segments or layers of the image. As shown for example in FIG. 1, soda can 110 is contained in a portion or segment (e.g., segmented object image portion 120) of 2-D image 100. The distance or depth G from camera 150 (e.g., from camera point of view PoV 151) of soda can 110 (i.e., the distance or depth of the segmented object image portion 120) can be readily computed using known intrinsic parameters (e.g., focal length f, x offset x0, y offset y0, and skew s) of the camera. The depth G of soda can 110 may, for example, be calculated as:

depth $G$=(focal length $f$)*(object real-world height $R$=122 mm)/(object image height $X$), for the case where the camera intrinsic parameters x0, y0, and s are all zero.

Fiducial markers (something placed in the field of view for use as a point of reference) can help an AR system determine the position and orientation (called pose) of its camera. While initially looking for feature points after camera images begin to stream into the AR system, an image recognition engine (e.g., Google Lens) may search the camera images for any recognizable objects. In example implementations, the recognized objects present in the scene with known real-world dimensions (a priori known or determined by web search) may be used as the fiducial markers by the AR system.

In example implementations. the disclosed methods may involve creating a separate auxiliary image known as the "depth map" for the 2-D image (or for each image frame or for a series of homogenous image frames) to indicate depths of objects present in the scene. In example implementations, the depth map may be a separate grayscale image having the same dimensions as an original 2-D image, with various shades of gray to indicate the depth of every part (i.e., segmented object image portion) of the frame.

In example implementations, as the set of recognizable objects identified in a camera feed of images of a real-world scene increases in size, the number of depth inferences on initial analysis of the camera feed will also increase. Depth maps and surface detection data needed for AR applications may be built in real time without requiring the user to move or swing the camera around (e.g., in a circular pattern).

Figure 2:
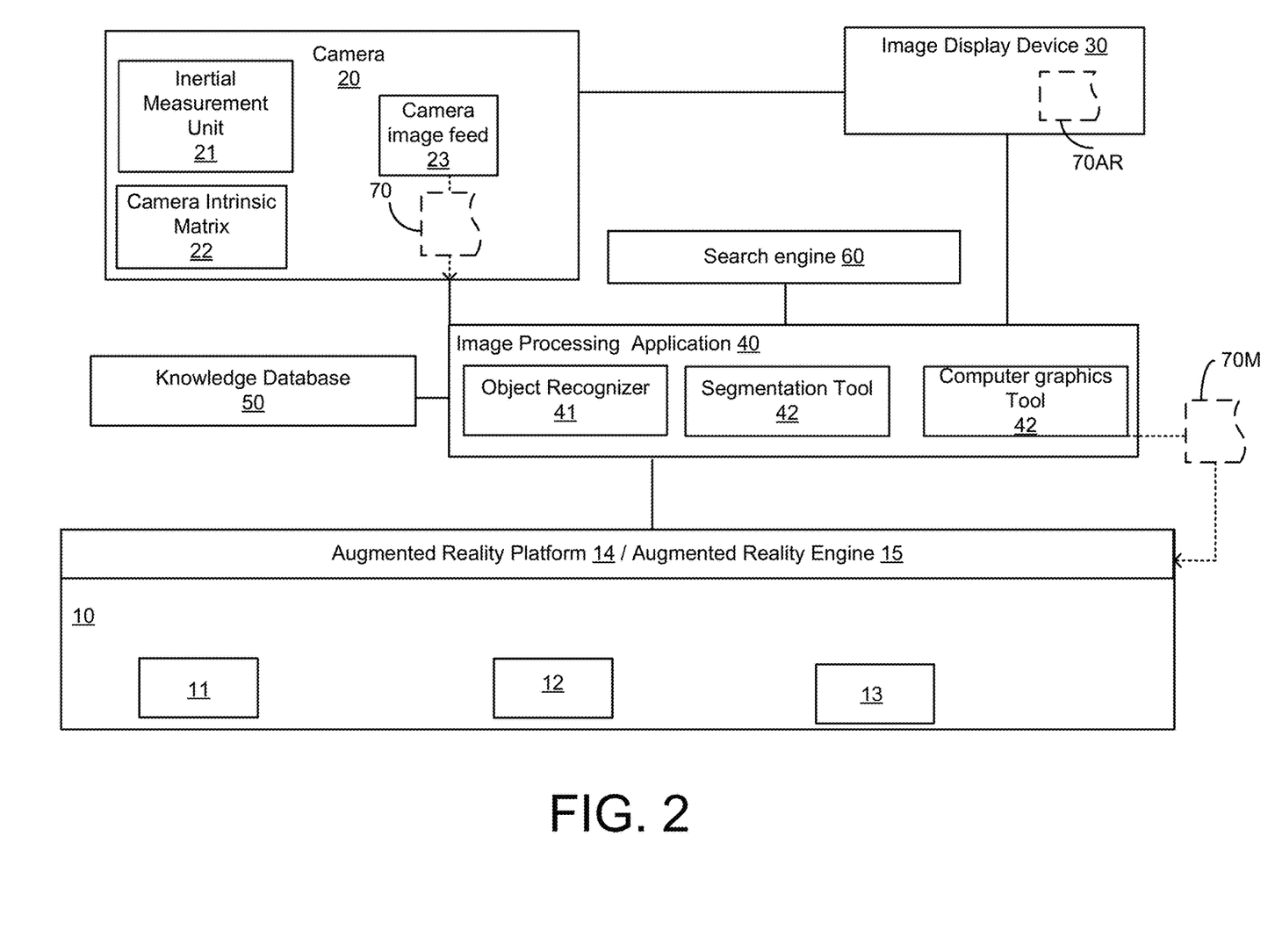
FIG. 2 is a block diagram illustrating an example image processing system for augmented reality applications, in accordance with the principles of the present disclosure.

FIG. 2 is a block diagram illustrating an example image processing system 200 for augmented reality applications, in accordance with the principles of the present disclosure.

System 200 may include an image processing application (e.g., image processing application 40) configured to analyze 2-D images captured by a camera 20 (e.g., a smartphone) and displayed, for example, on an image display device 30 (e.g., a smartphone display). Image processing application 40 may be configured to generate depth maps for objects, items, or features depicted in the 2-D images displayed on image display device 30.

In example implementations, camera 20 and image display device 30 may be components of a smartphone or other portable electronic imaging device. In example implementations, camera 20 may, for example, include an inertial measurement unit (IMU) 21 that can capture data about the device's movements. IMU 21 may, for example, contain one more sensors (e.g. accelerometers, gyroscopes, and magnetometers) to capture data about the device's movements. Camera 20 may include, or be characterized by, a camera intrinsic matrix 22. Camera intrinsic matrix 22 may include the camera's intrinsic parameters (e.g., focal length, x and y axis offsets, skew, and other field of view (FoV) parameters) that describe mapping of a scene in front of the camera to the pixels in a 2-D image captured on an image sensor (not shown) in the camera. Camera 20 may include a camera feed 23 configured to output image frames (captured by camera 20) one-by-one, or as a stream of image frames, for display, for example, on image display device 30.

In system 200, image processing application 40 may be hosted on, or run on, a computer system that may, for example, include one or more standalone or networked computers (e.g., a computing device 10). An example computing device 10 may, for example, include an operating system (e.g., an O/S 11), one or more processors (e.g., a CPU 12), and one or more memories or data stores (e.g., a memory 13), etc.

Computing device 10 may, for example, be a server, a desktop computer, a notebook computer, a netbook computer, a tablet computer, a smartphone, or another mobile computing device, etc. Computing device 10 may be a physical machine or a virtual machine. While computing device 10 is shown in FIG. 2 as a standalone device, it will be understood that computing device 10 may be a single machine, or a plurality of networked machines (e.g., machines in public or private cloud networks).

In example implementations, computing device 10 may support, or be coupled to, an augmented reality platform 14 and include an augmented reality engine 15. Augmented reality engine 15 may be configured to determine the positions of a camera (e.g., camera 10) relative to a scene in the field of view of the camera, based on, for example, the camera's intrinsic parameters (e.g., camera intrinsic matrix 22) and the camera's motion data (e.g., data generated by IMU 21). In example implementations, augmented reality engine 15 may have simultaneous localization and mapping (SLAM) capability (e.g., for camera localization and pose estimation, tracking of image features, and mapping of vertical and horizontal surfaces). The SLAM capability may allow augmented reality engine 15 to track image features, their locations and relations, as well as localize the camera position while camera 20 is moving through the environment. Augmented reality engine 15 may be configured to process 2-D images of the scene output by camera 20 (e.g., image frames streamed by camera feed 23), and use depth maps generated, for example, by image processing application 40 to position augmented reality content (objects or items) on the displays of the 2-D images of the scene on image display device 30.

In example implementations, image processing application 40 may be coupled to (or included in) augmented reality engine 15, and may be further coupled to a knowledge database 50 and a web search engine 60 (e.g., an Internet image search engine or browser). Knowledge database 50 may include a listing of objects (e.g., commonplace objects and items) and the known dimensions (size and scale) of the objects.

In example implementations, image processing application 40 may include an object recognizer module 41, an image segmentation tool 42, and a computer graphics tool 43.

Object recognizer module 41 may include machine-learnt algorithms, which may be based on trained neural network models, to recognize objects, items, or features in a 2-D image (e.g., image 70). The algorithms may be configured to identify recognizable objects in the images output by camera feed 23. Object recognizer module 41 may recognize one or more recognizable objects in the images.

Object recognizer module 41 may search knowledge database 50 (e.g., by object name or by object picture) to acquire available information on the dimensions of each of the recognized objects. If information on the dimensions of the recognized objects is not available in knowledge database 50, in some implementations, object recognizer module 41 may use a web search engine (e.g., search engine 60) to search other databases or the Internet to discover information on the dimensions of the recognized objects. In example implementations, object recognizer module 41 may update knowledge database 50 (e.g., for future use) with the newly discovered dimension data for one or more of the recognized image objects.

Image segmentation tool 42 coupled to object recognizer module 41 may divide or segment the 2-D image (e.g., image 70) into different segments or layers so that equally distant objects belong to one segment or portion and unequally distant objects belong to correspondingly different segments or portions. In example implementations, image segmentation tool 42 may segment the 2-D image (e.g., image 70) into one or more segmented object image portions respectively corresponding to each of the one or more recognizable objects in the images. For example, image segmentation tool 42 may segment the 2-D image (e.g., image 70) into a first segmented object image portion (e.g., segmented object image portion 120, FIG. 1) depicting or containing a first recognized object (e.g., soda can 110, FIG. 1).

In image processing application 40, computer graphics tool 43 may be configured to generate a depth map of recognized objects in the 2-D image. Computer graphics tool 43 may include depth-detection algorithms to determine, for each recognized object, a depth or distance of the segmented object image portion (depicting or the recognized object, e.g., segmented object image portion 120, FIG. 1) from camera 20. Computer graphics tool 43 may obtain the position coordinates of camera 20 based on processing of data generated by IMU unit 21 (e.g., by augmented reality engine 15).

In example implementations, the depth-detection algorithms in computer graphics tool 43 may determine the depth or distance of a segmented object image portion (depicting or containing a recognized object) from camera 20 based on the camera's intrinsic parameters (e.g., camera intrinsic matrix 22), the known real-world dimensions of the recognized object, and image dimensions of the recognized object as depicted in the segmented object image portion.

In example implementations, computer graphics tool 43 may determine the depth or distance of one or more recognized objects in 2-D images (e.g., image 70) of a scene and generate a depth map (e.g., depth map 70M) showing the depths of the one or more recognized objects/segmented object image portions in the images of the scene. The depths of the recognized objects/segmented object image portions (e.g., depth map 70M) are information about a third dimension of the scene depicted in the 2-D images (e.g., image 70).

Augmented reality engine 15 may display an AR-enhanced image (e.g., image 70AR) in which augmented reality objects and items overlay displays of the 2-D images of the scene on image display device 30 at different depths (i.e., in a third dimension). Unlike traditional approaches, augmented reality engine 15 does not have to obtain depth information by requiring or analyzing the camera motion during image capture. Instead augmented reality engine 15 can use depth map 70M to identify the depths of the objects/segmented object image portions in 2-D images of the scene. In example implementations, augmented reality engine 15 may use depth map 70M to properly overlay or position augmented reality objects and items in 3-dimensions (i.e., at the right depths) relative to camera position and the recognized objects/segmented object image portions in the 2-D images of the scene.

Figure 3:
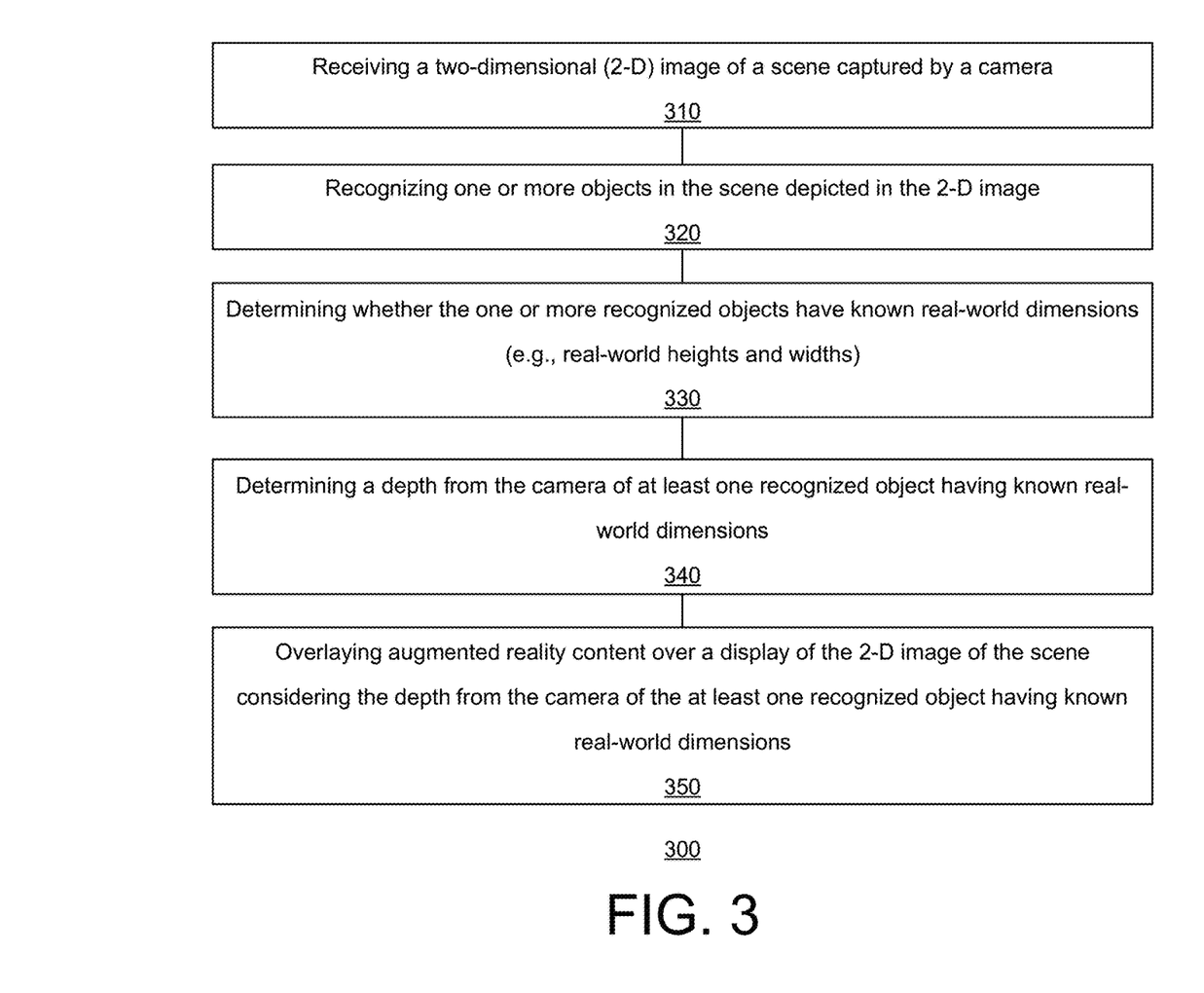
FIG. 3 is a flowchart of an example method, in accordance with the principles of the present disclosure.

FIG. 3 illustrates an example computer-implemented method 300 for enhancing two-dimensional (2-D) images of a real-world scene with three-dimensional (3-D) augmented reality content, in accordance with the principles of the present disclosure.

Method 300 includes receiving a 2-D image of the scene captured by a camera (310). The camera may be characterized by the camera's intrinsic parameters (e.g., focal length, x and y axis offsets and skew, and other field of view (FoV) parameters) that describe mapping of the scene in front of the camera to the pixels in the 2-D image captured on an image sensor in the camera. Co-ordinates of a point of view (PoV) of camera may represent a position of the camera when capturing the images. In example implementations the camera may be a smartphone or other mobile device.

Method 300 further includes recognizing one or more objects in the scene depicted in the 2-D image (320) and determining whether the one or more recognized objects have known real-world dimensions (e.g., real-world heights and widths) (330).

Recognizing one or more objects in the scene depicted in the 2-D image 320 may include using machine-learnt algorithms based on trained neural network models to recognize objects, items, or features in the 2-D image. Each of the one or more recognized objects as depicted in the image may have image dimensions (e.g., an object image height and an object image width).

Determining whether the one or more recognized objects have known real-world dimensions 330 may include looking up a knowledge database for the real-world dimensions of at least one recognized object listed in the knowledge database. Alternatively or additionally, determining whether the one or more recognized objects have known real-world dimensions may include conducting a web search (e.g., an image search on the Internet) to find information on the real-world dimensions of at least one recognized object. The method may further include updating the knowledge database (for future use) with the found information on the real-world dimensions of at least one recognized object.

Further, method 300 includes determining a depth from the camera of at least one recognized object having known real-world dimensions (340). In example implementations, determining the depth or distance from the camera of the at least one recognized object may include calculating the depth or distance based on the intrinsic parameters of the camera, and the known real-world dimensions and the image dimensions of the at least one recognized object. Further, determining the depth or distance from the camera of the at least one recognized object may include preparing a depth map corresponding to the 2-D image. The depth map may indicate the depths of objects present in the scene. Preparing the depth map may include segmenting the 2-D image into different segments or portions so that equally distant recognized objects belong to one segment or portion and unequally distant recognized objects belong to correspondingly different segments or portions.

Further, method 300 includes overlaying augmented reality content over a display of the 2-D image of the scene considering the depth from the camera of the at least one recognized object having known real-world dimensions (350). Overlaying the augmented reality content over the 2-D image of the scene may include using the depth map to determine positioning of the augmented reality content over the display of the 2-D image. Overlaying the augmented reality content over the display the 2-D image of the scene includes overlaying augmented reality content on the 2-D image of the scene displayed on a smartphone or other mobile device with a camera.

Figure 4:
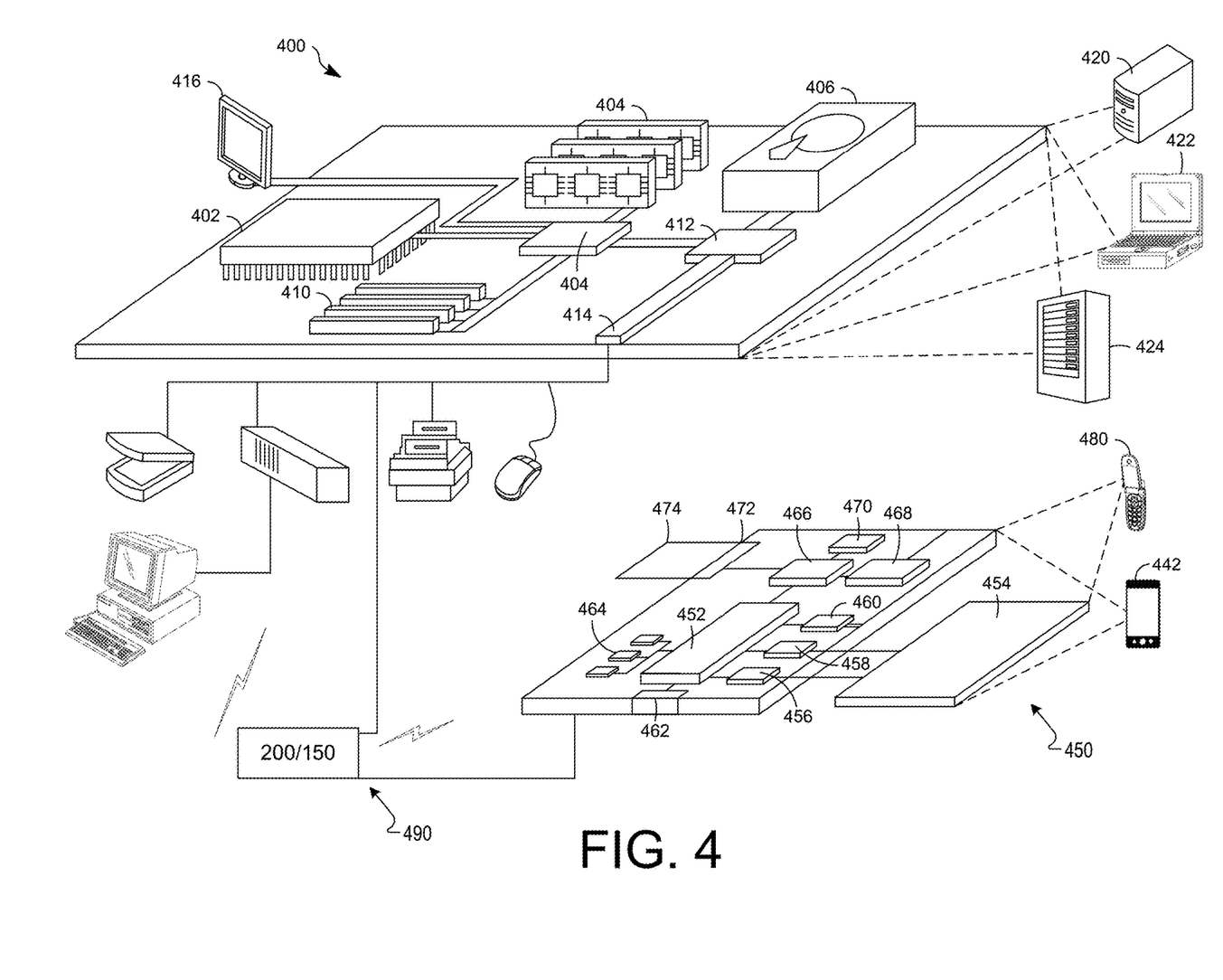
FIG. 4 is an illustration of a generic computer device and a generic mobile computer device coupled to the example image processing system of FIG. 2, in accordance with the principles of the present disclosure.

FIG. 4 shows an example of a generic computer device 400 and generic mobile computer devices 450, which may be used with augmented reality systems (e.g., system 200) and imaging devices (such as smartphone 150) and with the techniques described herein. Computing device 400 is intended to represent various forms of digital computers, such as laptops, desktops, tablets, workstations, personal digital assistants, televisions, servers, blade servers, mainframes, and other appropriate computing devices. For example, computing device 400 may be and/or be used as the server referenced above. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 466, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA600, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or another similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other embodiments are within the scope of the following claims.

What is claimed is:

1. A computer-implemented method, comprising:
receiving a two-dimensional (2-D) still image of a scene captured by a camera;
recognizing at least one object in the scene depicted in the 2-D still image;
determining whether the at least one object has known dimensions including a known height corresponding to an image height of the at least one object in the 2-D still image;
segmenting the 2-D still image into a segmented object image portion containing the at least one object having the known dimensions;
calculating a depth from the camera of the segmented object image portion containing the at least one object using only the known height of the at least one object, an intrinsic parameter of the camera, and the image height of the at least one object;

preparing a depth map corresponding to the 2-D still image using the depth from the camera of the segmented object image portion containing the at least one object; and overlaying augmented reality content over a display of the 2-D still image of the scene using the depth map to position the augmented reality content over the 2-D still image, wherein using the depth map to position the augmented reality content over the 2-D still image includes using the at least one object having the known dimensions present in the scene as a fiducial marker to determine a pose of the camera.

2. The computer-implemented method of claim 1, wherein recognizing the at least one object in the scene depicted in the 2-D still image includes running machine-learnt algorithms based on trained neural network models to recognize objects, items, or features in the 2-D still image.

3. The computer-implemented method of claim 1, wherein determining whether the at least one object has the known dimensions includes looking up a knowledge database for the dimensions of the at least one object listed in the knowledge database.

4. The computer-implemented method of claim 1, wherein determining whether the at least one object has the known dimensions includes conducting a web search to find information on the dimensions of the at least one object.

5. The computer-implemented method of claim 1, wherein preparing the depth map includes segmenting the 2-D still image into different segments or layers, wherein equally distant recognized objects belong to one segment or layer and unequally distant recognized objects belong to correspondingly different segments or layers.

6. The computer-implemented method of claim 1, wherein overlaying the augmented reality content over the display of the 2-D still image of the scene includes overlaying the augmented reality content on the 2-D still image of the scene displayed on a smartphone.

7. A computing device, comprising:
at least one processor; and
a memory storing instructions that, when executed by the at least one processor, cause the at least one processor to:
receive a two-dimensional (2-D) still image of a scene captured by a camera;
recognize at least one object in the scene depicted in the 2-D still image;
determine whether the at least one object has known dimensions including a known height corresponding to an image height in the 2-D still image;
segment the 2-D still image into a segmented object image portion containing the at least one object having the known dimensions;
calculate a depth from the camera of the segmented object image portion containing the at least one object using only the known height of the at least one object, an intrinsic parameter of the camera, and the image height of the at least one object;
prepare a depth map corresponding to the 2-D still image using the depth from the camera of the at least one object; and
overlay augmented reality content over a display of the 2-D still image of the scene using the depth map to position the augmented reality content, wherein using the depth map to position the augmented reality content over the 2-D still image includes using the at least one object having the known dimensions present in the scene as a fiducial marker to determine a pose of the camera.

8. The computing device of claim 7, wherein the camera is a camera of a smartphone, and wherein the augmented reality content and the 2-D still image of the scene are co-displayed on the smartphone.

9. The computing device of claim 7, wherein the instructions when executed by the at least one processor cause the at least one processor to run machine-learnt algorithms based on trained neural network models to recognize objects, items, or features in the 2-D still image.

10. The computing device of claim 7, wherein the instructions when executed by the at least one processor cause the at least one processor to look up a knowledge database for the dimensions of the at least one object listed in the knowledge database.

11. The computing device of claim 7, wherein the instructions when executed by the at least one processor cause the at least one processor to conduct a web search to find information on the dimensions of the at least one object.

12. The computing device of claim 7, wherein the instructions when executed by the at least one processor cause the at least one processor to prepare the depth map by segmenting the 2-D still image into different segments or layers with equally distant recognized objects belonging to one segment or layer and unequally distant recognized objects belonging to correspondingly different segments or layers.

13. A device, comprising:
a camera;
a processor; and
a memory, the processor configured to execute instructions stored in the memory causing the processor to:
receive a two-dimensional (2-D) still image of a scene recorded by the camera;
identify an object depicted in the 2-D still image as having known dimensions;
segment the 2-D still image into a segmented object image portion containing the object having the known dimensions including a known height corresponding to an image height in the 2-D still image;
calculate a depth from the camera of the segmented object image portion containing the object using only the known height of the object, an intrinsic parameter of the camera, and the image height of the object;
prepare a depth map corresponding to the 2-D still image using the depth from the camera of the segmented object image portion containing the object; and
overlay augmented reality content over a display of the 2-D still image of the scene using the depth map to position the augmented reality content over the 2-D still image, wherein using the depth map to position the augmented reality content over the 2-D still image includes using the object present in the scene as a fiducial marker to determine a pose of the camera.

14. The device of claim 13, wherein the processor is further configured to find information on the dimensions of the object using a web search.

15. The device of claim 13, wherein the processor is coupled to a knowledge database listing dimensions of one or more objects.

16. The device of claim 13, wherein the processor is coupled to an augmented reality engine configured to generate the augmented reality content.

17. The device of claim 13 wherein the camera, the processor and the memory are further configured as a mobile phone or a computing device.

\* \* \* \* \*